United States Patent [19]

Crim

[11] 3,854,017

[45] Dec. 10, 1974

[54] TELEPHONE AND ELECTRIC CORD REEL

[76] Inventor: Walter W. Crim, P.O. Box 1276, Pacifica, Calif. 94044

[22] Filed: Dec. 18, 1972

[21] Appl. No.: 316,108

[52] U.S. Cl...... 191/12.2 R, 137/355.23, 242/107.6

[51] Int. Cl...... H02g 11/00

[58] Field of Search....... 137/355.16, 355.17, 355.2, 137/355.21, 355.23; 242/107.6; 191/12.2 R, 12.4

[56] References Cited

UNITED STATES PATENTS

| | | | |
|---|---|---|---|
| 2,135,739 | 11/1938 | Todd | 191/12.2 R |
| 2,998,277 | 8/1961 | Himel | 191/12.2 R |
| 3,657,491 | 4/1972 | Ryder | 191/12.2 R |
| 3,705,962 | 12/1972 | Banister | 191/12.4 |

*Primary Examiner*—M. Henson Wood, Jr.
*Assistant Examiner*—D. W. Keen
*Attorney, Agent, or Firm*—Julian Caplan

[57] ABSTRACT

A reel for a telephone or electric cord. A spiral resilient conductor associated with each conductor in the cord. One end of each spiral resilient conductor is attached to the cord spool within the reel and is electrically connected to one of the cord conductors. The other end of each spiral resilient conductor is attached to the base on which the spool rotates so that the spiral resilient conductor expands and contracts radially as the cord is wound onto or unwound from the spool. The spool carries insulative discs that define a slot to constrain and insulate each of the spiral resilient conductors.

6 Claims, 5 Drawing Figures

PATENTED DEC 10 1974 3,854,017

TELEPHONE AND ELECTRIC CORD REEL

This invention relates to a reel for a cable or cord that has one or more electrical conductors therein. More particularly, the invention relates to a structure for incorporation into such cord reel that affords direct connection to the conductors in the cord without interfering with the winding or unwinding of the cord on the reel.

The present invention has particular application to three conductor electrical cords that extend from a wall mounted connecting block to a telephone instrument. The invention is not, however, limited to the telephone environment but finds utility in any similar application where hard wiring to an electrical cord, rather than wiring through a brush-collector ring combination, is necessary or desirable.

The convenience of long telephone cords (e.g., 25 feet in length) is impaired because the cord tends to kink or twist to a degree that is at best unsightly and at worst impossible to extend without time-consuming untwisting. Cord reels that effect connection to the cord conductors by employment of a brush-collector ring combination are not satisfactory for telephone signal levels because the level of both the voice and dialing signals is so low that noise occurring at the brush-collector ring connectijon produces an intolerable signal-to-noise ratio.

In high power-consuming electrical appliances such as portable electric tools, the noise arising from a brush-collector ring connection is not a problem, but the resistance of such connection is a problem in that excessive heating occurs at the connection and sometimes is the direct result of failure in the connection. Moreover, such connection in high powered applications has a tendency to spark, thereby being unsatisfactory in locations at which volatile or flammable vapors may be present.

It is accordingly an object of the present invention to provide a connection for a cord reel that is hard wired thereby obviating the above mentioned shortcomings of the brush-collector ring connection. This object is achieved by providing a spiral resilient conductor for each conductor in the cord. Each spiral resilient conductor has a suitable number of convolutions therin and has one end fixed to the spool on which the cord is wound and the other end fixed to the casing or base with respect to which the spool rotates. Preferably, the diameter of the spiral in which the resilient conductor is formed is less than the periphery of the spool to minimize the length of the current path through the spiral resilient conductor.

Another object of the present invention is to provide a reel for a telephone or power cord wherein two or more conductors can be separately hard wired. This object is achieved by providing one spiral resilient conductor, as referred to above, in association with each conductor in the electric cord or cable and by providing rigid insulative members concentric with the axis of rotation of the spool for constraining and insulating the spiral resilient conductors from one another.

Another object of the present invention is to so construct the terminations for the cord or cable on the spool that they can be readily connected or disconnected so as to be compatible with conventional telephone company procedures and specifications.

Other objects, features and advantages of the present invention will be more apparent after referring to the following specification and accompanying drawings in which.

Figures 1, 2, 3, 4, 5:
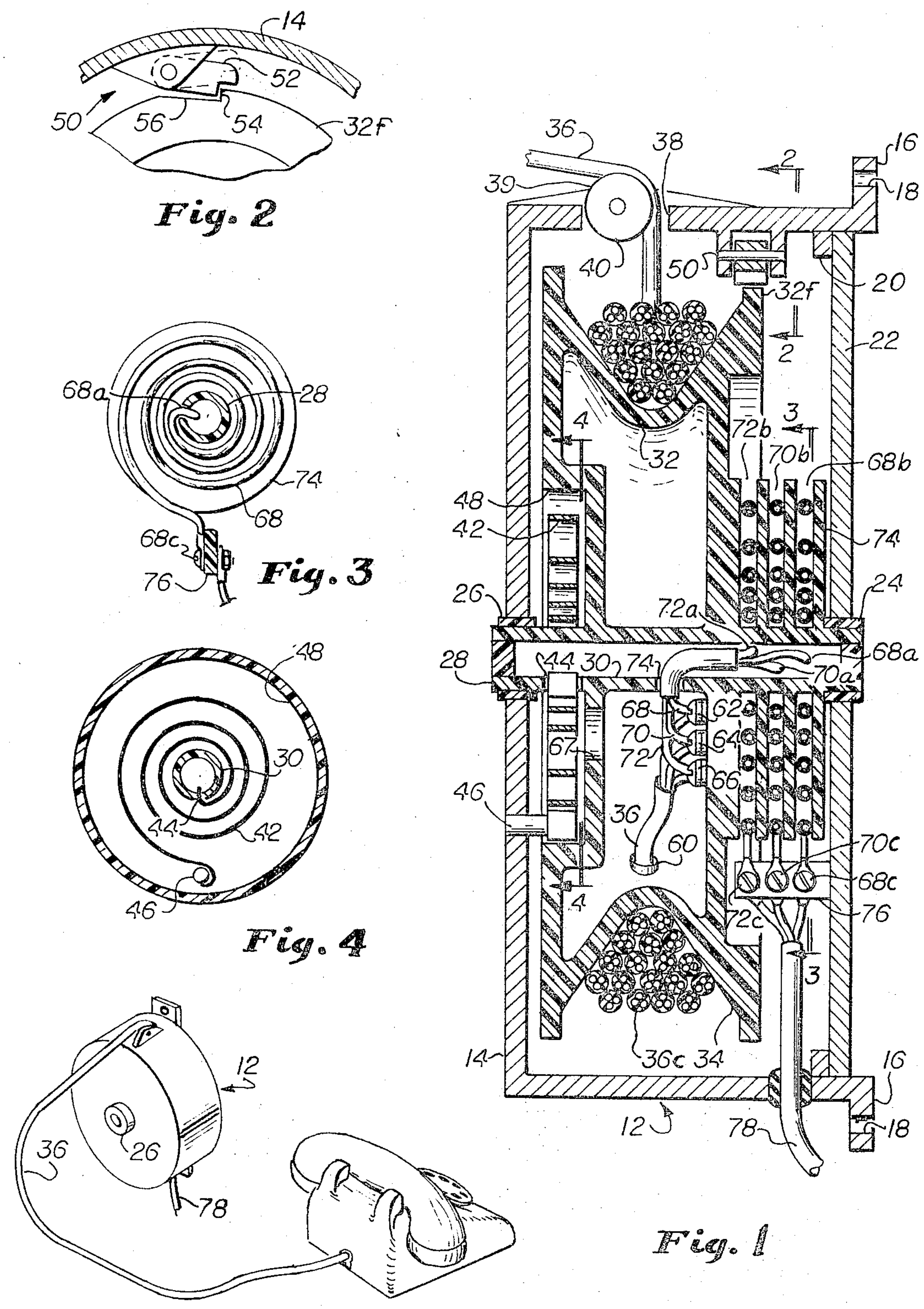
FIG. 1 is a side elevation view in cross section of a reel mechanism embodying the present invention.
FIG. 2 is a detail view taken along line 2—2 of FIG. 1 and showing one satisfactory mechanism for releaseably and selectively locking the spool in the reel against rotation.
FIG. 3 is a sectional view taken along line 3—3 of FIG. 1 showing a spiral resilient conductor and its terminations according to the present invention.
FIG. 4 is a cross-sectional view taken along line 4—4 of FIG. 1 showing a spiral spring for powering the spool in the reel to rewind the electric cord or cable as desired.
FIG. 5 is a perspective view showing a reel according to the present invention associated with a conventional telephone desk set.

Referring more particularly to the drawing, reference numeral 12 generally indicates a reel mechanism embodying the present invention. Reel 12 includes a housing 14 from which mounting flanges 16 extend, the mounting flanges being provided with screw holes 18 for mounting the mechanism on to a wall surface or the like. Casing 14 is of generally cylindric form and has interiorally thereof a circular flange 20 against which is supported a base plate 22. Centrally of base plate 22 is a bushing 24; the opposite wall of casing 14 is provided with an aligned bushing 26. Between bushing 24 and 26 is supported a shaft 28 which in the embodiment of the invention shown in the drawing is hollow to define a central axially extending opening 30. Rigid with shaft 28 is a spool 32 at the periphery of which is an annular groove 34 in which convolutions 36*c* of a cord or cable 36 are received. Casing 14 is provided with a cable opening 38 adjacent which is a guide roller 39 for guiding cord 36 into groove 34 of spool 32.

For rewinding cable 36 onto spool 32, the spool is rotatively biased or powered by a spiral spring 42. Spring 42 has one end fastened to shaft 28 by means of a slot 44 through the wall of the shaft; the other end of the spring is fastened to casing 14 by a pin 46 which projects into the interior of the structure from the front wall of the casing. One flange or end wall of spool 32 defines a cylindric cavity 48 for housing the spring. Thus, when the cord 36 is withdrawn from the spool 32, energy is stored in spring 42 and is available to rewind the cord when desired. For selectively and releaseably locking the spool against the force of spring 42, such as would be desired when the telephone is being used at a location remote from reel 12, the reel includes a spool locking mechanism indicated generally at 50. Mechanism 50 includes a pawl 52 pivotally mounted on the interior of housing 14 in alignment with one of the flanges 32F of spool 32. The periphery of flange 32F is notched at one or more sites (preferably four) to form teeth or abutments 54 at one extremity of the notch and at ramp surface 56 at the opposite extremity of the notch. This arrangement permits cord 36 to be unwound from spool 32 because the spool rotates in a clockwise direction, as viewed in FIG. 2, without restriction. When it is desired to retract cord 36, it is only necessary to effect rotation of spool 32 in a clockwise direction as viewed in FIG. 2 and then release the same rapidly so as to prevent pawl 52 from entering the notches and into engagement with abutment 54, and permit spring 42 to rotate the spool so as to wind the cable on the spool.

Cable 36 typically includes a plurality of conductors; in the embodiment shown in the drawing the cable contains three conductors as is typical in telephone instruments. The end of cord 36 remote from the telephone extends through an opening 60 at the bottom of groove 34 in spool 32 and the three conductors are electrically and mechanically connected to respective screw binding posts indicated at 62, 64 and 66. As can be seen, the binding posts are fixed to and rotate with spool 34. An access opening 67 is provided in the wall of spool 32 to afford access to the screw binding posts. Extending from binding posts 62, 64 and 66, respectively, are the first ends of resilient conductors 68, 70 and 72. The conductors extend through an opening 74 in shaft 28 and extend axially along cavity 30 to respective openings **68*a*, 70*a* and 72*a* in the shaft wall. In radial alignment with each of the latter openings is a slot, such slots being designated respectively as 68*b*, 70*b* and 72*b*. The slots are defined between the surfaces of a plurality of discs 74 that are rigid with and extend radially from shaft 28. Discs 74 are preferably normal to the axis of shaft 24 and are spaced from one another so that the slots 68*b* and 70*b* and 72*b* have a width slightly in excess of conductors 68, 70 and 72 and their insulation. The discs 74 thus constrain the spiral conductors and insulate them from one another. Each of the conductors has a second end mechanically and electrically connected to a respective binding post 68*c*, 70*c* and 72*c*. Such binding posts are threaded into an insulative bar 76 which is rigid with base plate 22. Also connected to binding post screws 68*c*, 70*c* and 72*c* are the conductors of a cable 78 which extends to the wall mounted connecting block or like signal source, not shown. It will be seen in FIG. 1 that bar 76 is spaced from the periphery of discs 74 to avoid interference with rotation of the discs; the bar is sufficiently close to the periphery of the discs that the spiral resilient conductors remain within slots 68*b*, 70*b*, 72*b*** at all times.

With reference to FIG. 3, it will be noted that conductor 68, which is exemplary of conductors 70 and 72 also, is of spiral form. The showing of the spiral form in FIG. 3 is somewhat schematic in the interests of simplicity and clarity, it being understood that each spiral resilient conductor 68, 70 and 72 has sufficient length, number of convolutions, and space between adjacent convolutions that the conductors will not inhibit rotation of spool 32 for the full extension of cord 36. In one reel designed in accordance with the present invention, each spiral resilient conductor 68, 70 and 72 is formed of manganese bronze wire having a single strand of about .075–.100 inches diameter, and coated with electrically insulated polyethylene having a thickness of about .025 inches. The inherent resilience in such material, together with the walls of disc 74 that define slots **68*b*, 70*b* and 72*b* constrain and guide the spiral resilient conductors as spool 32 is rotated relative to insulative block 76.** Moreover, such material, in addition to its physical characteristics, has adequate electrical conductivity so that a signal of satisfactory amplitude is conducted therethrough.

From the foregoing detailed description of each of the component elements of one satisfactory embodiment constructed according to the present invention, the operation of the device will be apparent. As the cord 32 is withdrawn from reel 12, spool 32 rotates, and stores energy in spring 42. During rotation of the spool, spiral resilient conductors residing within slots **68*b*, 70*b* and 72*b* wind up within the slots. Because of the length and resilience of the spiral conductors, a hard wired static-free circuit is maintained between cable 78 and cord 36, thereby eliminating static or like interference. When the cord 36 is to be retracted, it is withdrawn sufficiently to release pawl 54 from engagement with abutment 78, whereupon spring 42 drives the spool to rewinding cord 36 thereon. Spiral resilient conductors 68, 70 and 72** follow this rotation and are at all times constrained within the appropriate slot.

It will be noted that spiral conductors 68, 70 and 72 are located relatively close to the central axis of shaft 28 and that slot 34 and spool 32 are located relatively remote from the axis. This relative position is desirable in that it reduces or minimizes the length of the spiral conductors and accordingly, the depth or radial extent of slot **68*b*, 70*b* and 72*b*.** It will be further noted that the reel of the present invention can be readily incorporated into existing telephone wiring arrangements since attachment to the device is achieved by screw binding posts, a widely used expedient in telephone equipment. Moreover, because the current path is continuous and is hard wired without intervention of any brush-collector ring arrangement, it conforms to current carrying and noise level specifications.

Although the present invention has been described in connection with a conventional telephone set, it will be clear that the invention has application in many other applications in which static and/or sparking is unacceptable. Moreover, certain structural arrangements of the various parts are shown by way of example, and are not intended to limit the present invention since many structural details for embodying the present invention will occur to those skilled in the art.

Although one embodiment of the invention has been shown and described, it will be obvious that other adaptations and modifications can be made without departing from the true spirit and scope of the invention.

What is claimed is:

1. In a reel for a conductive multistrand cable a base, a rotatable cable storing spool that revolves about an axis on said base in one direction to dispense the cable and an opposite direction to retract the cable, a plurality of spiral resilient conductors each having a first end joined to the spool and electrically connected to the cable conductor, each of said spiral resilient conductors separate from each other and each coaxial with said spool, all said spiral resilient conductors being located axially remote from said spool, and a spring fixed to said base and said spool to rewind said spool to retract said cables, said spring being remote from said frame, said cable, and from said spiral resilient conductors.

2. An electrical connection structure according to claim 1 wherein each said second end of said spiral resilient conductor is disposed radially outward of said first end thereof.

3. An electrical connection structure according to claim 2 wherein said first and second ends reside in a common plane substantially normal to said axis and means for constraining the portion of said spiral resilient conductor intermediate said ends within said plane.

4. An electrical connection structure according to claim 3 wherein said constraining means comprises means forming a pair of surfaces normal to the axis, said surfaces being axially spaced apart to define a slot, said spiral resilient conductor residing within said slot.

5. An electrical connection structure according to claim 3 wherein said spool includes a shaft rigid therewith and coaxial with said axis, said shaft having an extension axially of said spool and a central opening therethrough, said constraining means being mounted on said extension, and conductor means extending through said central opening for connecting said cable to said first end of said spiral resilient conductor.

6. A cable storing apparatus for a cable that has at least first and second electrical conductors therein comprising a base, a spool having a shaft supported for rotation about an axis on said base, said spool having a peripheral annular groove for containing the cable, means for resiliently biasing said spool in a first direction to wind the cable thereon within said annular groove, means for selectively and releasably locking said spool against the force of said biasing means, said spool having first and second termination means adjacent the inner radial extremity of said groove for effecting mechanical and electrical connection of respective said first and second electrical conductors, first and second conductor means extending from respective said termination means to respective first and second axially spaced apart points on said shaft, means rigid with said shaft for defining first and second axially spaced slots that extend radially of said shaft at respective said points, first and second spiral resilient conductors disposed in respective slots and circumscribing said shaft, said spiral resilient conductors each having a first end connected to respective said conductor means at respective said points, each said spiral resilient conductor having a second end remote from respective said first ends, and means rigid with said base and in alignment with said slots for supporting respective said second conductor ends.

* * * * *